J. A. DEVINE.
AUTOMATIC INDICATOR CONNECTING COUPLING.
APPLICATION FILED JULY 13, 1907.
903,814.
Patented Nov. 10, 1908.
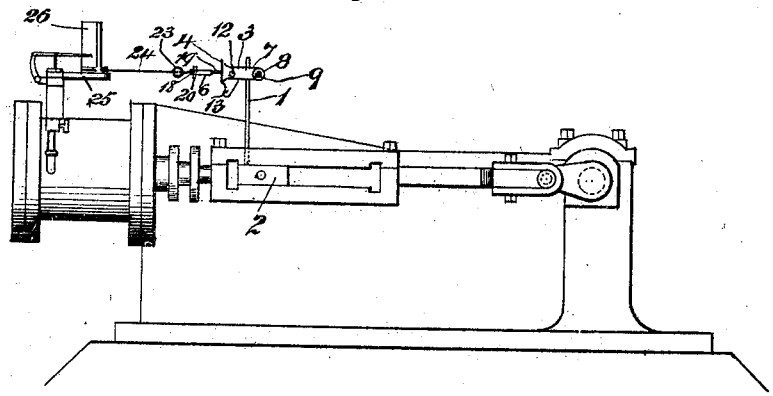
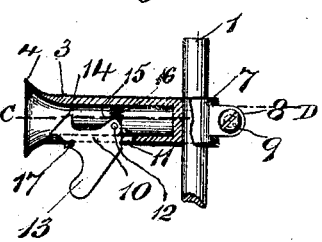
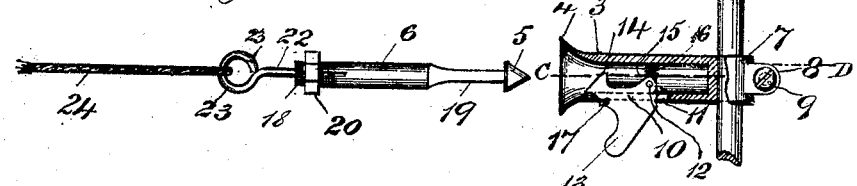
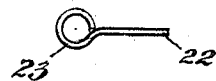
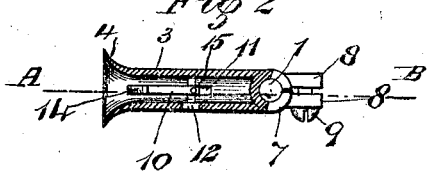
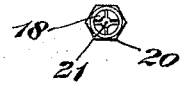
WITNESSES:
Francis M. Springer
J. M. Springer.
INVENTOR
John A. Devine
BY
Thompson R. Bell
ATTORNEY

UNITED STATES PATENT OFFICE.

JOHN A. DEVINE, OF INDIANAPOLIS, INDIANA.

AUTOMATIC INDICATOR-CONNECTING COUPLING.

No. 903,814.  Specification of Letters Patent.  Patented Nov. 10, 1908.

Application filed July 13, 1907. Serial No. 383,710.

*To all whom it may concern:*

Be it known that I, JOHN A. DEVINE, a citizen of the United States, residing at Indianapolis, in the county of Marion and State of Indiana, have invented certain new and useful Improvements in Automatic Indicator-Connecting Couplings, of which the following is a specification, reference being had therein to the accompanying drawing.
My invention relates to an automatic coupling means for connecting the motion transmitting means or cord of a steam engine indicator to a reciprocating part of a steam engine, as the cross-head, as hereinafter set forth and particularly pointed out in the claims.

The object of this invention is to provide a coupling means whereby the indicator motion transmitting means or cord will be readily connected or disconnected while the engine is in motion. I attain this object by means of the coupling illustrated in the accompanying drawings in which like numerals of reference designate like parts throughout the several views.

Figure 1 is an enlarged longitudinal sectional detail view taken along the line A—B in Fig. 2; Fig. 2 is a similar view taken along the line C—D in Figs. 1 and 6; Fig. 3 is an enlarged detail view of the coupling pin; Fig. 4 is an end detail view of the same showing the clamping nut screwed on the split end of the same; Fig. 5 is an enlarged detail view of the indicator cord connecting hook; and, Fig. 6 is a side elevational view of a steam engine showing an indicator and my invention of a coupling means applied thereto.

A rod 1 is secured to a reciprocating part of the engine to be indicated, preferably, in this case, to the cross-head 2, and extends vertically therefrom. The coupling 3 is tubular in form and is provided with a flared or bell-mouth formed open end 4 whereby the engaging plug end of the coupling-pin 6 may be the more easily entered to be engaged while the engine is in motion. Integral on the closed end of the tubular coupling 3 is provided a split boss 7 which is bored to loosely receive the rod 1, and on the said boss situated on the opposite sides of said split thereof are formed the integral clamping lugs 8 which are provided with a clamping-screw 9 whereby said lugs are drawn together to clamp said boss on said rod 1 to firmly secure said tubular coupling when set in position on said rod. The spring latch 10 extends upwardly through the longitudinally extending slot 11 of the tubular coupling to be hingedly connected to and mounted on the body of the screw 12 which extends through the bore of said tubular coupling 3 to be secured therein. The bottom trigger end 13 of the spring-latch 10 projects considerably beyond the outer surface of the tubular coupling 3 an extent sufficient to be readily struck by any suitable object, as a rod, spanner, or such, to tilt the hinge latch 10 to cause the catch 14 to disengage the plug or engaging end 5 of the coupling pin 6. A spring retaining nipple 15 is formed on the latch 10 which is encircled by a coil spring 16 whereby the latter is held in position on said spring latch. A stop-pin 17 is provided on said latch and the same is provided for the purpose of preventing the catch 14 moving too far into the bore of the tubular coupling which would prevent its operation to engage the coupling pin 6.

The coupling pin 6 is provided with a catch end or plug ended portion 5 and an enlarged split ended portion 18 and a reduced central portion 19. The split enlarged end portion 18 of the coupling pin is slightly tapered toward its end and threaded to receive the screw nut 20. An end bore 21 is formed to extend centrally with the axis of the pin 6 and is adapted to receive the stem 22 of the eye 23. The end of the indicator cord 24 is secured to the eye 23. The indicator motion transmitter or cord 24 is connected at its opposite end to the indicator 25 in the usual manner to operate the indicator drum 26.

The manner of using my invention will be understood from the following description:—

The cylinder 25 is first placed and secured in operative position and connected to the cylinder of the engine in the usual way, as shown in Fig. 6. The rod 1 is next secured to a reciprocating part of the engine, as the crosshead 2. I next apply the hub 7 of the tubular coupling 3 to the rod 1 and adjust the same in position thereon so that the bell-mouth or open flaring end 4 will be directed toward, and its center will be on a line with the horizontally extending indicator cord 24 as shown in Fig. 6. The clamping screw 9 is now tightened to cause the split boss 7 to securely clamp said rod 1 to hold the tubular coupling 3 in its adjusted position.

Before starting the engine the operator adjusts the indicator cord 24 to the length required to impart the proper amount of rotation to the drum 26 of the indicator. The operator now starts the engine and next takes the coupling pin 6 and holds in position with the plug or engaging end 5 directed toward the open bell-mouthed or flared end 4 of the tubular coupling 3 and by gradually moving the said plug or engaging end 5 of the coupling pin 6 toward said tubular coupling to the proper position the same is engaged immediately it enters said coupling and the connection made and motion is immediately imparted to the drum 26 of the indicator and the same is ready to make a card. The indicator card having been made the indicator must be at rest to remove the card therefrom or to replace it with a new blank card. To bring the indicator drum 26 to rest the cord 24 must be disconnected from the coupling 3. This is readily accomplished by the operator who, by the use of a suitable tool or piece of metal, strikes the trigger 13 which operates the latch 10 to swing on its pin 12 to tilt the said latch sufficiently to release the catch 14 from the plug or engaging end 5 of the coupling pin 6 which latter becomes released immediately and flies back toward the indicator. The indicator cord being thus released, the drum 26 comes to rest, so that the card with the diagram marked thereon may be removed and a blank card applied to the said drum if such is desired.

Sometimes it is desirable to make a number of cards in succession and during the time of the taking of which the cord 24 may stretch or become extended and thereby not impart the proper motion to the drum 26. This extension of the cord 24 must be taken up from time to time during the test as the cord extends. For this purpose I provide the simple means illustrated in Fig. 3, and which consists of the adjustable eye 23 having the stem 22 which is removably secured and adjustable longitudinally in the bore 21 of the split end of the coupling pin 6. To take up any extension of the cord 24 all that is necessary to be done is to turn the nut 22 which is screwed on the split end 18 of the coupling pin 6 toward the smaller end of the tapered split end 18 till the stem 22 is loose in the bore 21 so as to be capable of being moved longitudinally in said bore. This being done the stem 22 is pushed into the bore 21 till the extension of the cord 24 is taken up after which the nut 20 is screwed on said end 18 till the latter clamps said stem 22 in said bore 21 and the indicator cord 24 is adjusted and the apparatus is ready for use again.

I claim:—

1. In a motion transmitter for an indicator, the combination with a reciprocating part of a steam engine, of a rod removably secured thereto, a coupling socket adjustably secured to said rod, said socket carrying a spring latch, a coupling pin adapted to engage said latch and to be attached to the indicator, the said latch having a depending leg adapted to be tripped, whereby the coupling pin may be released while the engine is in motion.

2. In a motion transmitter for an indicator, the combination with a reciprocating part of a steam engine, of a rod removably secured thereto, a coupling socket adjustably secured to said rod, a spring latch hingedly mounted in said socket, a coupling pin to engage said latch and to be attached to the indicator, and a depending leg on said latch adapted to be tripped, whereby the coupling pin may be released while the engine is in motion.

In testimony whereof I affix my signature in presence of two witnesses.

JOHN A. DEVINE.

Witnesses:
THOMPSON R. BELL,
O. C. IRVIN.